United States Patent [19]

Wrenn, Jr. et al.

[11] Patent Number: 4,770,930
[45] Date of Patent: Sep. 13, 1988

[54] MULTILAYERED THERMAL INSULATION FORMED OF ZIRCONIA BONDED LAYERS OF ZIRCONIA FIBERS AND METAL OXIDE FIBERS AND METHOD FOR MAKING SAME

[75] Inventors: George E. Wrenn, Jr., Clinton; Cressie E. Holcombe, Jr., Farragut, both of Tenn.

[73] Assignee: Martin Marietta Energy Systems, Inc., Oak Ridge, Tenn.

[21] Appl. No.: 933,944

[22] Filed: Nov. 24, 1986

[51] Int. Cl.$^4$ ............................................. B32B 15/04
[52] U.S. Cl. .................................... 428/285; 428/332; 428/469; 428/701
[58] Field of Search ............... 428/701, 285, 289, 332, 428/469, 284

[56] References Cited

U.S. PATENT DOCUMENTS 4,526,824  7/1985  Dworak et al. ................ 428/701 X
4,629,661  12/1986  Hilbert et al. ................... 428/701 X Primary Examiner—Thomas J. Herbert
Attorney, Agent, or Firm—Herman L. Holsopple; Bruce M. Winchell

[57] ABSTRACT

A multilayered thermal insulating composite is formed of a first layer of zirconia-bonded zirconia fibers for utilization near the hot phase or surface of a furnace or the like. A second layer of zirconia-bonded metal oxide fibers is attached to the zirconia fiber layer by a transition layer formed of intermingled zirconia fibers and metal oxide fibers. The thermal insulation is fabricated by vacuum molding with the layers being sequentially applied from aqueous solutions containing the fibers to a configured mandrel. A portion of the solution containing the fibers forming the first layer is intermixed with the solution containing the fibers of the second layer for forming the layer of mixed fibers. The two layers of fibers joined together by the transition layer are saturated with a solution of zirconium oxynitrate which provides a zirconia matrix for the composite when the fibers are sintered together at their nexi.

8 Claims, No Drawings

MULTILAYERED THERMAL INSULATION FORMED OF ZIRCONIA BONDED LAYERS OF ZIRCONIA FIBERS AND METAL OXIDE FIBERS AND METHOD FOR MAKING SAME

This invention was made as a result of work under contract DE-AC05-840R21400 between Martin Marietta Energy Systems, Inc., and the U.S. Department of Energy.

BACKGROUND OF THE INVENTION

The present invention relates generally to high temperature thermal insulation and, more particularly, to a multilayered one-piece composite of thermal insulation formed of a layer of zirconia-bonded zirconia fibers joined to a layer of zirconia-bonded metal oxide fibers by a transition layer or zone formed of intermingled zirconia-bonded zirconia fibers and metal oxide fibers.

High temperature environments such as encountered in metallurgical furnaces, rocket propulsion nozzles and liners, and atmospheric reentry of aerospace vehicles require the use of thermal insulation capable of withstanding the high temperatures encountered while protecting nearby components from excessive heat.

A thermal insulation found to be highly satisfactory for use in applications where temperatures as high as about 2000° C. are present is formed of zirconia fibers joined together in a zirconia matrix with the fibers being partially stabilized to maintain a cubic phase structure during temperature cycling. This thermal insulation is the subject of assignee's copending U.S. patent application Ser. No. 810,899 filed Dec. 20, 1985, and entitled "High-Temperature Zirconia Insulation and Method for Making Same." Inasmuch as the zirconia fibers, zirconia matrix, and zirconia stabilizing agents are the same or essentially the same as described and claimed herein and since the method utilized for molding the thermal insulation in assignee's application employ many similar steps, the aforementioned application is incorporated herein by reference.

While the zirconia fiber insulation described in assignee's above-identified application is a lightweight self-supporting insulation capable of providing highly desirable thermal insulating properties in high temperature environments, the cost of such insulation could be a drawback which detracts from its utilization in many applications. It has been found that a thermal insulation formed of essentially pure zirconia is required in environments having a hot face or surface subject to temperatures of about 2000° C. However, the cost of the zirconia fibers with zirconia is relatively high as compared with insulation formed of metal oxide fibers such as alumina and silica.

SUMMARY OF INVENTION

Accordingly, it is the primary objective or aim of the present invention to provide thermal insulation that is relatively less expensive than the essentially pure zirconia-bonded zirconia fiber insulation as described in assignee's aforementioned patent application but which has the capability of utilization in environments encountering temperatures up to about 2000° C. Such an insulation provides for the economic justification for upgrading existing furnaces and the use of metallurgical furnaces in the most cost-effective manner. The thermal insulation of the present invention is multilayered thermal insulating composite structure which comprises a first layer consisting essentially of zirconia fibers in a zirconia matrix and in which a zirconia stabilizing agent is employed. A second layer of thermal insulation consists essentially of fibers of a metal oxide other than zirconia in a zirconia matrix. A transition layer or zone joins together the zirconia fiber layer and the metal oxide fiber layer and consists essentially of intermingled fibers or zirconia and the metal oxide in the matrix of zirconia together with a zirconia fiber stabilizing agent. The zirconia stabilizing agent is in the composite in a concentration adequate to maintain at least a portion of the zirconia fibers in a cubic phase.

The multilayered thermal insulation composite of the present invention is a one-piece self-supporting structure fabricated by a vacuum molding process in which a first layer of fibers, the metal oxide fibers or the zirconia fibers, are deposited from an aqueous slurry onto a perforated mandrel of a desired configuration. The fibers forming the second layer which differ from those of the first layer are intermingled with a portion of the first-layer fibers remaining in the slurry and deposited upon the first layer to form a zone or transition layer of mixed fibers. A second layer of fibers different from the fibers in the first layer is then deposited on the transition layer. The two layers of fibers and the transition layer of mixed fibers are then saturated with a solution of zirconium oxynitrate which is converted to zirconia upon heating and then sintered or bonded to join together the fibers at their crossover points or nexi to form the one-piece structure.

Other and further objects of the invention will be obvious upon understanding the illustrative embodiment and method about to be described or will be indicated in the appended claims and various advantages not referred to herein will occur to one skilled in the art upon employment of invention in practice.

DETAILED DESCRIPTION OF THE INVENTION

The multilayered thermal insulating composite of the present invention is a self-supporting one-piece structure formed of a layer of zirconia fibers which are partially stabilized and bound or joined at their nexi within a matrix of zirconia with this layer being capable of exposure to a hot face or surface at a temperature up to about 2000° C. This zirconia layer is joined by a transition or intermediate layer of mixed fibers to a metal oxide-fiber layer bound or joined by a zirconia matrix with this layer being disposed adjacent to a cooler surface or wall for adsorption of heat passing through the zirconia fiber layer to protect nearby structures or components. The transition layer or zone intermediate the zirconia fiber layer and the metal oxide layer is formed of intermingled partially stabilized zirconia fibers and metal oxide fibers joined together at their nexi by zirconia with this intermediate or transition layer accommodating for differences in the thermal expansion coefficients of the metal oxide fibers and the zirconia fibers s as to maintain the structure in one piece during thermal cycling. However, the coefficient of thermal expansion of the metal oxide fibers chosen for use in the insulation should be essentially similar to that of zirconia in order to maintain the continuity of the one-piece structure during relatively large temperature cycles. Substantial differences in the coefficient of thermal expansion between the metal oxide layer and the zirconia fiber layer cannot be adequately accommodated by the transition layer. The shrinkage behavior of the layers on initial firing is also of great importance. For example, the use of silica fibers with the zirconia fibers will not function satisfactorily. The coefficient of thermal expansion of silica is acceptabl for use with zirconia; however, initial firing shrinkages of the two layers are considerably different and will cause disruption of the thermal insulation structure upon initial thermal cycling.

The composite of the present invention can be fabricated in any desired configuration and can be machined to the specific dimensions required for the intended application.

The zirconia fibers employed in the fabrication of the thermal insulation of the present invention are of better than 99.9% purity and are in the size range of about 75–150 micrometers in length and about 3–7 micrometers in diameter. These fibers are partially stabilized with an oxide selected from yttria, calcia, magnesia, or any other suitable zirconia stabilizing agent. The partial stabilization of the zirconia fibers can be achieved by employing about 6–10 wt. % yttria, 5–8 wt. % calcia, or about 6 wt. % magnesia. The partial stabilization of the zirconia fibers and the zirconia matrix is for maintaining a portion of the zirconia fibers in a cubic phase during temperature cycling so as to permit microcracking while preventing the formation of destructive crystallographic phases in zirconia fibers. By maintaining a portion of the fibers in a cubic phase while the remainder of the fibers changes from a cubic to a monolithic phase or vice versa during temperature cycling, the fibers are subjected to only minimal microcracking. The microcracking releases thermal stresses created during temperature cycling for maintaining structural integrity of the thermal insulation composite during high temperature cycles.

The metal oxide fibers employed in the present invention are preferably formed of alumina at a length of about 75 to 150 micrometers and a diameter of about 0.5 to 2.5 micrometers. Other metal oxide fibers such as mullite and other alumina-silicate ceramic fiber compositions, or yttria which have a coefficient of thermal expansion sufficiently similar to that of zirconia may be satisfactorily employed in the present invention. These fibers may be employed alone or in combinations with one another in the composite of the present invention and should be of a similar length and diameter so as to form a transition layer capable of retaining the integrity of the entire structure during thermal cycling.

The fibers forming each of the layers of the present invention are bound together in a zirconia matrix. The zirconia matrix is also partially stabilized in the zirconia fiber layer to add greater stability to the matrix and the overall insulation composite. This partial stabilization of the zirconia matrix is normally achieved during the sintering of the zirconia fiber layer since some of the stabilizer in the fibers migrates to the matrix by diffusion. Also, if desired, some additional stabilization of the matrix can be provided by adding a small quantity of one or more of the aforementioned stabilizing agents to the zirconium oxynitrate solution. The zirconia matrix thoroughly bonds together the zirconia fibers and the metal oxide fibers at their nexi so as to provide a self-supporting one-piece structure. The zirconia utilized as the matrix material is preferably provided by zirconia oxynitrate since zirconia compounds such as halogens and sulfates have not been found to be satisfactory since some halide and sulfide residue remain in the composite after heating so as to significantly detract from the use of the insulation in high temperature applications.

The composite structure of the present invention may have a total thickness in the range of about 1.25 to 3.0 inches with the zirconia fiber layer being of a thickness of about 0.5 to 0.75 inch, the transition layer being of a thickness of about 0.0625 to 0.1875 inch, and the metal oxide layer being in a thickness of about 0.9375 inch to 2.0625 inches. In some instances, additional metal oxide layers may be added to the oxide layer with these additional layers being formed of metal oxide fiber structure having a coefficient of thermal expansion closely corresponding to the zirconia fibers.

In order to provide a more facile understanding of the present invention, examples are set forth below pertaining to the formation of the multilayered thermal insulation of the present invention. The zirconia fibers employed in the fabrication of the insulation in the example have been partially stabilized with 8 wt. % yttria.

EXAMPLE I

An aqueous slurry containing 20 grams of zirconia fibers per liter and another aqueous slurry containing 5 grams of alumina fibers per liter were prepared in make-up tanks equipped with mechanical stirrers for maintaining any aqueous solutions in the tanks in a slurried state. A perforated cylindrical mandrel, covered with a filter cloth, was positioned in a molding tank. Water was added to the molding tank to a height of at least 12 inches above the top of the mandrel, then the zirconia fiber slurry was added to the tank and a vacuum of 50–60 cm of mercury was applied to the inside of the mandrel for drawing the slurry an depositing the fibers onto the surface of the cylindrical mandrel. After approximately 80 percent of the zirconia fibers were withdrawn from the slurry in the tank and deposited on the mandrel, the aqueous slurry of alumina fibers was added to the zirconia fiber make-up tank. As with the zirconia fibers, the alumina fibers and the 20 percent of the zirconia fibers remaining in the tank were drawn onto the layer of zirconia fibers previously deposited upon a mandrel to form a layer of alumina and zirconia fibers. The deposition of the remaining alumina fibers from the slurry onto the mandrel form a layer of essentially alumina fibers on the zirconia-alumina fiber layer. The water remaining in the molding tank was then drawn through the fibrous deposits on the mandrel to leave the fibers moistened. The mandrel and the cylindrical mass of moist fibers thereon was then removed from the tank and wrapped with a plastic sheet for application of the zirconia matrix-forming solution. Twelve hundred grams of zirconium oxynitrate was dissolved in 720 ml of concentrated nitrate acid and then diluted to 2 liters total volume with water. The cylindrical fibrous mass was then immersed in the binder solution for effecting complete saturation of the fibrous mass with the zirconium oxynitrate solution. After a soaking duration of approximately 20–30 minutes, the wet solution-fibrous mass along with the supporting mandrel was placed in an oven and warmed at a temperature of 60° C. in air for a duration of about 24 hours to precipitate and dry the zirconium oxynitrate to form a green body binder. The layered-fibrous mass was then taken from the oven, the plastic sheet removed, and the resulting cylindrical shape dried at 60° C. for a duration of 24 hours. After drying, the fibrous cylinder was taken from the oven, the mandrel removed, and the fibrous cylinder placed in a furnace where it was heated to 1225° C. for a duration of 20 hours. During this heating, the zirconium oxynitrate was converted to zirconium oxide, and the zirconium oxide derived from the binder joined together the fibers at their nexi by sintering so as to form the self-supporting multilayered composite. The composite was maintained at the 1225° C. temperature for a duration of 20 hours to assure adequate sintering of the fibers with the zirconia binder at the nexi of the fibers.

The prepared multilayered fibrous composite had a porosity of 82–87 vol. %, an overall density of 0.47 grams per cubic centimeters and a total thickness of 1.20 inch. The thickness of the zirconia fiber layer was 0.45 inch, the thickness of the transition layer or zone provided by the intermingled zirconia and alumina fibers was 0.10 inch, and the thickness of the alumina fiber was 0.65 inch.

EXAMPLE II

An aqueous slurry containing 20 g/l of zirconia fibers and another aqueous slurry containing 5 g of alumina fibers per liter were prepared and molded into a multilayered fibrous mass in a vacuum molding tank as described in Example I. The mandrel employed in this example was a flat perforated mandrel so as to provide a flat multilayered thermal insulating structure. The molded fibers were saturated with a solution containing zirconium oxynitrate, dried and the zirconium oxynitrate converted to zirconia for sintering as in Example I. Upon completion of sintering as in Example I, the resulting flat body of thermal insulation had a porosity of 82–87 vol. %, a overall density of 0.46 g per cubic centimeter, and a total thickness of 1.00 inch. The layer of zirconia fibers had a thickness of 0.35 inch, the transition layer of zirconia fibers and alumina fibers had a thickness of 0.10 inch, and the layer of alumina fibers had a thickness of 0.55 inch.

In the preparation of the thermal insulating composite as described above, the concentration or volume of the various oxide fibers may be increased or decreased to provide layers of different thicknesses depending upon the desired use. The thickness of the zirconia fiber layer should be in the range of about 0.5 to 0.75 inch in order to provide adequate insulation and protection to the metal oxide fiber layers when the insulation is exposed to hot-face temperatures in the range of about 1900° to 2200° C. The ratio of thicknesses as set forth in the above examples are merely illustrative of the multilayered composites obtainable by practicing the present invention. As pointed out above, an additional layer or layers of selected metal oxide fibers may be added to the metal oxide layer to increase the thickness of the thermal insulating composite which may be desirable for some applications. The self-supporting, multilayered composites prepared in accordance with the method of the present invention can have a total average porosity in the range of about 80–90 vol. %, an overall density in a range of about 0.3 to 0.6 g/cc and a total thickness in a range of about 1 to 3 inches. If desired, the density of the composite may be further increased by treating the fiber structure with additional zirconium oxynitrate binder solution. The wet fibrous mass can be warmed in air in an oven at 60° C. over a period of about 24 to 48 hours between each treatment. The sintering of the matrix to the fibers in each layer is achieved in air at a temperature in the range of about 1200° to 1250° C. for a duration of about 10 to 20 hours.

It will be seen that the present invention provides a multilayered composite of different materials which provides many advantages over a composite of essentially pure zirconia fibers, with the greatest advantage being that the layer of essentially pure zirconia fibers can be placed at or towards the higher temperature region while the less expensive phase chemistries provided by the metal oxide fibers are placed in cooler temperature regions so that desirable thermal insulating properties are achieved and yet the cost-effectiveness of the insulation is maintained by employing less expensive metal oxide fibers in the insulation.

We claim:

1. A multilayered thermal insulating composite structure comprising:
    a first layer consisting essentially of zirconia fibers, a zirconia matrix, and a zirconia stabilizing agent,
    a second layer consisting essentially of fibers of a metal oxide other than zirconia and a zirconia matrix, and
    a transition layer intermediate said first and second layers and consisting essentially of intermingled fibers of zirconia and said metal oxide and a zirconia matrix, said zirconia stabilizing agent being in said composite in a concentration adequate to maintain at least a portion of the zirconia fibers in a cubic phase.

2. A multilayered thermal insulating composite as claimed in claim 1 wherein said metal oxide is alumina.

3. A multilayered thermal insulating composite as claimed in claim 1 wherein the layer of zirconia fibers is of a thickness in the range of about 0.5 to 0.75 inch when the layer of zirconia fibers is exposed to a temperature in the range of about 1900° to 2200° C.

4. A multilayered thermal insulating composite as claimed in claim 1 wherein the zirconia stabilizing agent is yttria, calcia, or magnesia.

5. A multilayered thermal insulating composite as claimed in claim 1 wherein the layer of fibers of the metal oxide is formed of a metal oxide having a coefficient of thermal expansion essentially similar to the zirconia fibers.

6. A multilayered thermal insulating composite as claimed in claim 5 wherein said metal oxide is alumina.

7. A multilayered thermal insulating composite as claimed in claim 6 wherein said composite has a total average porosity in the range of about 80 to 90 vol. %.

8. A multilayered thermal insulating composite as claimed in claim 7 wherein the density of said composite is in the range of about 0.3 to 0.6 grams per cubic centimeter.

* * * * *